United States Patent
Chou et al.

(10) Patent No.: US 10,353,400 B2
(45) Date of Patent: Jul. 16, 2019

(54) NAVIGATION SYSTEM AND NAVIGATION METHOD

(71) Applicant: ASUSTeK COMPUTER INC., Taipei (TW)

(72) Inventors: Hung-Chyun Chou, Taipei (TW); Ting-Ying Wu, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 93 days.

(21) Appl. No.: 15/597,141

(22) Filed: May 16, 2017

(65) Prior Publication Data

US 2017/0336800 A1     Nov. 23, 2017

Related U.S. Application Data

(60) Provisional application No. 62/340,480, filed on May 23, 2016.

(30) Foreign Application Priority Data

Mar. 27, 2017 (CN) .......................... 2017 1 0187592

(51) Int. Cl.
    *G05D 1/02*      (2006.01)
    *B25J 5/00*      (2006.01)
    (Continued)

(52) U.S. Cl.
CPC ............ *G05D 1/0274* (2013.01); *B25J 5/007* (2013.01); *B25J 9/1664* (2013.01); (Continued)

(58) Field of Classification Search
CPC . B25J 5/007; B25J 9/162; B25J 9/1664; B25J 9/1666; G05D 1/0088; (Continued)

(56) References Cited

U.S. PATENT DOCUMENTS 4,751,658 A * 6/1988 Kadonoff ................. B25J 5/007
                                                180/168
4,920,520 A * 4/1990 Gobel .................. G01S 15/931
                                                367/909
(Continued)

FOREIGN PATENT DOCUMENTS

| CN | 100568144 C | 12/2009 |
|---|---|---|
| CN | 102621986 A | 8/2012 |

(Continued)

OTHER PUBLICATIONS

EPO machine translation of CN 100568144 C (original CN document, published Dec. 9, 2009) (Year: 2009).*

*Primary Examiner* — Behrang Badii
*Assistant Examiner* — David A Testardi
(74) *Attorney, Agent, or Firm* — CKC & Partners Co., LLC

(57) ABSTRACT

A navigation system adapted to an electronic device is provided. The navigation system comprises: a processor configured to control a movement direction of the electronic device according to a navigation path, obtain spatial information, and set a waypoint according to the spatial information; and a plurality of distance measuring modules for measuring a waypoint distance between the electronic device and the waypoint. When the processor determines the waypoint distance is less than a waypoint threshold value, the processor is configured to calculate a first distance and a second distance according to the obstacle distances measured by the distance measuring modules. The processor is configured to control the electronic device to have a first movement, a second movement and a third movement according to the first distance and the second distance. A navigation method is further provided.

17 Claims, 9 Drawing Sheets

(51) Int. Cl.
*B25J 9/16* (2006.01)
*G05D 1/00* (2006.01)
*G01C 21/20* (2006.01)

(52) U.S. Cl.
CPC ......... *G05D 1/0088* (2013.01); *G05D 1/0212* (2013.01); *G05D 1/0255* (2013.01); *G01C 21/206* (2013.01); *G05D 2201/0214* (2013.01)

(58) Field of Classification Search
CPC .... G05D 1/0212; G05D 1/0238; G05D 1/024; G05D 1/0274; G01C 21/206
See application file for complete search history.

(56) References Cited

U.S. PATENT DOCUMENTS

| | | | | |
|---|---|---|---|---|
| 5,155,683 | A * | 10/1992 | Rahim | G05D 1/0038 180/168 |
| 5,276,618 | A * | 1/1994 | Everett, Jr. | G05D 1/0246 180/167 |
| 5,545,960 | A * | 8/1996 | Ishikawa | G05D 1/0255 318/568.12 |
| 5,576,947 | A * | 11/1996 | Wienkop | G05D 1/0255 180/168 |
| 5,687,294 | A * | 11/1997 | Jeong | G05D 1/0221 318/568.12 |
| 5,781,697 | A * | 7/1998 | Jeong | G05D 1/0255 700/247 |
| 5,804,942 | A * | 9/1998 | Jeong | G05D 1/0255 318/580 |
| 5,942,869 | A * | 8/1999 | Katou | B25J 5/00 318/568.12 |
| 5,947,225 | A * | 9/1999 | Kawakami | G05D 1/0219 180/167 |
| 2004/0006423 | A1 * | 1/2004 | Fujimoto | G05D 1/0206 701/467 |
| 2005/0187678 | A1 * | 8/2005 | Myeong | G05D 1/0255 701/27 |
| 2006/0058921 | A1 * | 3/2006 | Okamoto | G05D 1/0214 700/255 |
| 2006/0074528 | A1 * | 4/2006 | Uehigashi | G05D 1/0242 700/258 |
| 2008/0009965 | A1 * | 1/2008 | Bruemmer | G05D 1/0088 700/245 |
| 2008/0009968 | A1 * | 1/2008 | Bruemmer | G06N 3/008 700/245 |
| 2009/0093907 | A1 * | 4/2009 | Masaki | G05D 1/024 700/248 |
| 2009/0234499 | A1 * | 9/2009 | Nielsen | B25J 9/161 700/250 |
| 2011/0035087 | A1 * | 2/2011 | Kim | B25J 9/1666 701/25 |
| 2011/0166737 | A1 * | 7/2011 | Tanaka | G05D 1/0274 701/25 |
| 2011/0196562 | A1 * | 8/2011 | Kume | A61G 5/006 701/23 |
| 2015/0283700 | A1 | 10/2015 | Trautman et al. | |
| 2017/0248961 | A1 * | 8/2017 | Pfaff | G05D 1/0225 |

FOREIGN PATENT DOCUMENTS

| | | |
|---|---|---|
| CN | 103592944 A | 2/2014 |
| CN | 104977941 A | 10/2015 |
| JP | 2017004230 A * | 1/2017 |

* cited by examiner

NAVIGATION SYSTEM AND NAVIGATION METHOD

CROSS-REFERENCE TO RELATED APPLICATION

This application claims the priority benefit of U.S. provisional application Ser. No. 62/340,480, filed on May 23, 2016, and China application serial No. 201710187592.6, filed on Mar. 27, 2017. The entirety of the above-mentioned patent applications are hereby incorporated by references herein and made a part of specification.

BACKGROUND OF THE INVENTION

Field of the Invention

The disclosure relates to a navigation system and a navigation method and, more specifically, to a navigation system and a navigation method which are applied in a mobile robot.

Description of the Related Art

Robot navigation technology is maturely developed in recent years. Since many objects or electronics are usually configured at home which influent the interior design, the need that a home service robot that have good and stable autonomous navigation capability is increased day by day.

BRIEF SUMMARY OF THE INVENTION

According to an aspect of the disclosure, a navigation system adapted to an electronic device is provided. The navigation system comprises a processor and a plurality of distance measuring modules. The process is configured to control a movement direction of the electronic device according to a navigation path, obtain spatial information, and set a waypoint according to the spatial information. The plurality of distance measuring modules is configured to measure a waypoint distance between the electronic device and the waypoint. When the processor determines the waypoint distance is less than a waypoint threshold value, the processor is configured to calculate a first distance and a second distance according to the obstacle distances measured by the distance measuring modules. When the first distance is less than the second distance, the processor is configured to control the electronic device to have a first movement. When the first distance is larger than the second distance, the processor is configured to control the electronic device to have a second movement. When the first distance is equal to the second distance, the processor is configured to control the electronic device to have a third movement.

According to another aspect of the disclosure, a navigation method is provided. The navigation method comprises: obtaining spatial information and setting a waypoint according to the spatial information; measuring a waypoint distance between the electronic device and the waypoint; determining whether the waypoint distance is less than a waypoint threshold value; calculating to obtain a first distance and a second distance by a processor according to a plurality of obstacle distances measured by the distance measuring modules when it is determined that the waypoint distance is less than a waypoint threshold value. When the first distance is less than the second distance, the processor controls the electronic device to have a first movement. When the first distance is lamer than the second distance, the processor controls the electronic device to have a second movement. When the first distance is equal to the second distance, the processor controls the electronic device to have a third movement.

By setting the waypoint, the navigation system detects the distance between the mobile robot and the waypoint, and obtains the traveling speed and the turning coefficient of the target mobile robot. The mobile robot moves according to the traveling speed and the turning coefficient, which prevents the mobile robot from colliding with the obstacles.

BRIEF DESCRIPTION OF THE DRAWINGS

These and other features, aspects and advantages of the disclosure will become better understood with regard to the following embodiments and accompanying drawings.

DETAILED DESCRIPTION OF THE EMBODIMENTS

Figure 1B:
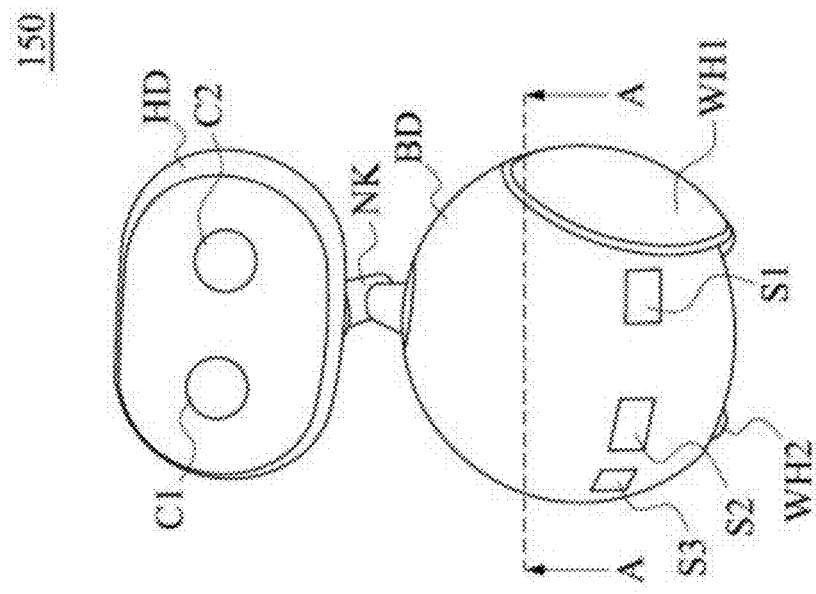
FIG. 1B is a schematic diagram showing a mobile robot in an embodiment.
Figure 1A:
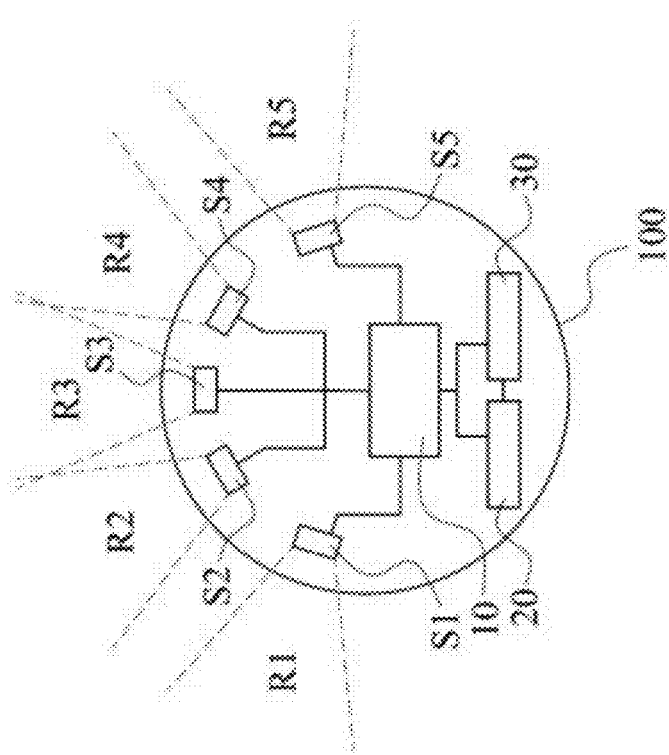
FIG. 1A is a schematic diagram showing a navigation system in an embodiment.

Please refer to FIGS. 1A to 1B. FIG. 1A is a schematic diagram showing a navigation system 100 in an embodiment. FIG. 1B is a schematic diagram showing a mobile robot 150 in an embodiment. In an embodiment, a navigation system 100 includes a processor 10 and a plurality of distance measuring modules S1 to S5. In an embodiment, the navigation system 100 further includes a storage module 20 and a power supply 30.

In an embodiment, the processor 10 is a microcontroller, a microprocessor, a digital signal processor, an application specific integrated circuit (ASIC) or a logic circuit, which is not limited herein. In an embodiment, each of the distance measuring modules S1 to S5 includes an ultrasonic transmitter, a receiver and a control circuit. In an embodiment, the distance measuring modules S1 to S5 are ultrasonic distance measuring modules, laser range finders, or other distance measuring devices. In an embodiment, the storage module 20 is used for storing map information. The storage module 20 is a memory, a hard disk or a mobile hard disk, which is not limited herein.

In an embodiment, the processor 10, the distance measuring modules S1 to S5, the storage module 20 and the power supply 30 are disposed inside the mobile robot 150 (such as a body BD). In an embodiment, components (as shown in FIG. 1A) inside the mobile robot 150 can be seen from a section view of the mobile robot 150 along a line A-A in FIG. 1B.

In the embodiment, the electronic device is the mobile robot 150. In an embodiment, the electronic device is an autonomous moving electronic device, which is not limited herein. In an embodiment, the mobile robot 150 is a home service robot with an autonomous navigation function. That is, the mobile robot 150 moves along a navigation path that is pre-defined or determined based on a real-time detection. For example, the mobile robot 150 moves between a living room and a room.

In an embodiment, the mobile robot 150 includes a head HD, a body BD and a neck NK connecting to the head HD and the body BD.

In an embodiment, the processor 10 of the mobile robot 150 is configured to control speeds and turnings of wheels WH1 and WH2 via a control motor(s) (not shown). Thus, the mobile robot 150 can move along the navigation path.

In an embodiment, the head HD of the mobile robot 150 includes cameras C1 and C2 for capturing images. In an embodiment, the camera C1 or C2 includes a charge coupled device (CCD) or a complementary metal-oxide semiconductor (CMOS) sensor.

Figure 2:
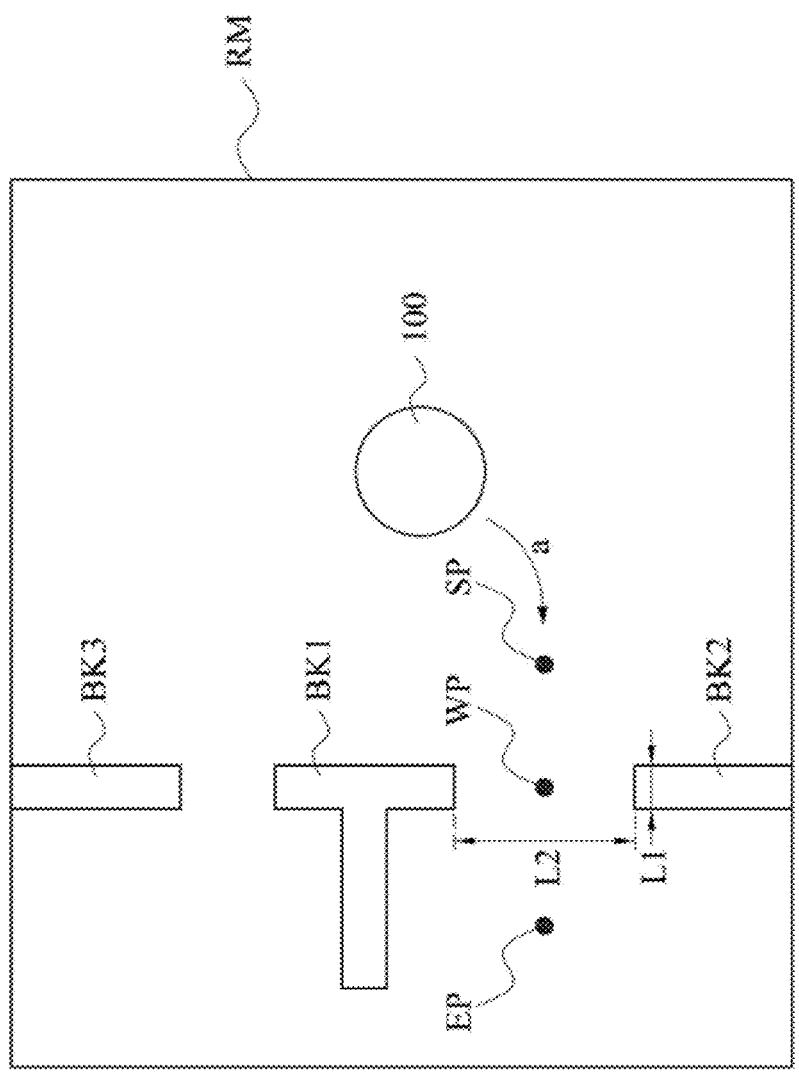
FIG. 2 is a schematic diagram showing an operating environment for a navigation system in an embodiment.
Figure 3:
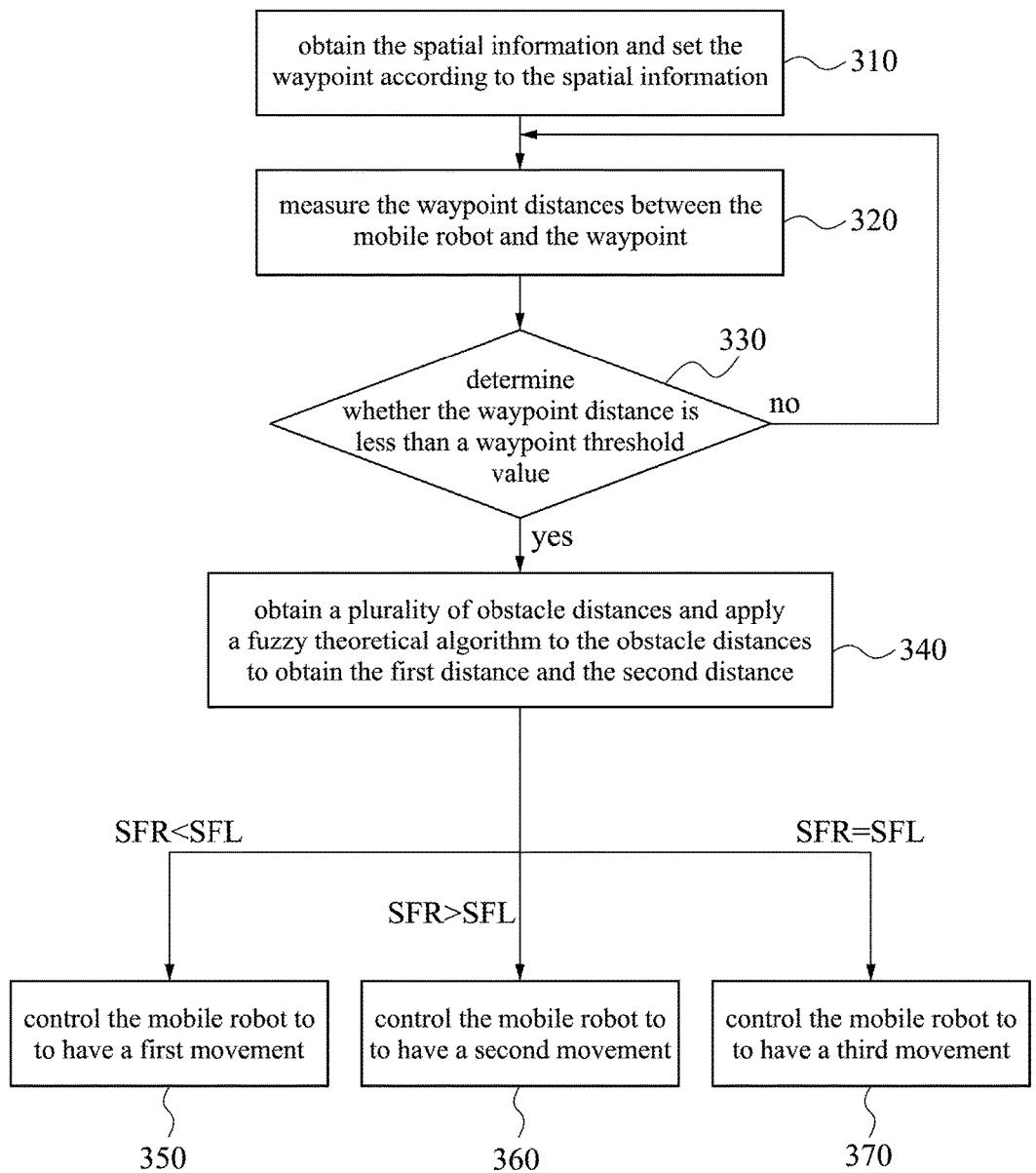
FIG. 3 is a flow chart of a navigation method in an embodiment.

Please refer to FIG. 2 to FIG. 3. FIG. 2 is a schematic diagram showing an operating environment RM for a navigation system 100 in an embodiment. FIG. 3 is a flow chart of a navigation method 300 in an embodiment. The embodiments described hereinafter can be implemented by the navigation system 100 in FIG. 1A. In the embodiment, the number of the distance measuring modules S1 to S5 is five. In embodiments, the number and positions of the distance measuring modules are changed according to requirements.

In FIG. 2, the operating environment RM of the navigation system 100 is a living room. In an embodiment, the operating environment RM includes a plurality of walls BK1 to BK3 to separate the room. In the embodiment, the processor 10 of the navigation system 100 obtains the map information of the operating environment RM from the storage module 20 to set the navigation path, and obtain spatial information. The spatial information includes at least an obstacle position. In an embodiment, the spatial information includes a passageway position, a passageway length, a wall position, a wall thickness, a wall length, a door position, a door width, etc. In an embodiment, the walls BK1 to BK3 are considered as the obstacles on the way when the navigation system 100 moves. The positions of the walls BK1 to BK3 are the obstacle positions.

In an embodiment, the processor 10 is configured to plan the navigation path by combining the map information with an autonomous path-finding method (such as, a random coverage method or a path planning method). Details for the method are not described hereinafter.

In step 310, the processor 10 obtains the spatial information, and sets the waypoint WP according to the spatial information.

As shown in FIG. 2, after the processor 10 sets the navigation path and obtains the spatial information according to the map information, a door (or a narrow passageway) between the walls BK1 and BK2 in the operating environment RM is determined. The door has a length L2 (such as 80 centimeters) and a width L1 (such as 20 centimeters). The waypoint WP is set in the middle (i.e., the middle of the length L2 and the width L1) of the door. In an embodiment, the processor 10 plans that the mobile robot 150 moves from the current position toward the waypoint WP in a direction a. In other embodiments, the processor 10 sets the waypoint WP at the door position.

In an embodiment, the processor 10 is further configured to set an obstacle space starting point SP and an obstacle space destination EP according to the obstacle position, and sets the waypoint WP between the obstacle space starting point SP and the obstacle space destination EP.

When the processor 10 determines that the mobile robot 150 reaches the obstacle space starting point SP, that means, the mobile robot 150 is about to pass the waypoint WP (which represents a narrow room). At the time, the processor 10 detects and adjusts the turning and the traveling speed of the mobile robot 150 to prevent the mobile robot 150 from colliding with the obstacles. When the processor 10 determines that the mobile robot 150 reaches the obstacle space destination EP, which means, the mobile robot 150 has already passed the waypoint WP.

In step 320, the distance measuring modules S1 to S5 measure the waypoint distances between the mobile robot 150 and the waypoint WP, respectively.

In an embodiment, the distance (which is considered as the waypoint distance) between the current position of the mobile robot 150 and the waypoint WP is determined by the distance measuring modules S1 to S5 via a positioning method (such as an environment map model-based matching and positioning method or a beacon positioning method).

In an embodiment, the mobile robot 150 includes cameras C1 and C2 to capture environmental images or depth images to measure the waypoint distance between the mobile robot 150 and the waypoint WP. In an embodiment, an encoder is used to measure the waypoint distance between the mobile robot 150 and the waypoint WP.

In step 330, the processor 10 determines whether the waypoint distance is less than a waypoint threshold value. If the waypoint distance is less than the waypoint threshold value, step 340 is performed. If the waypoint distance is not less than the waypoint threshold value, the processor 10 continues to measure the waypoint distance between the mobile robot 150 and the waypoint WP in step 320. In an embodiment, the processor 10 presets the waypoint threshold value as a constant value (such as 30 centimeters) and determines whether the waypoint distance is less than 30 centimeters.

In an embodiment, the processor 10 presets the waypoint threshold value as the distance (such as 40 centimeters) between the obstacle space starting point SP and the waypoint WP. When the waypoint distance is 30 centimeters, the processor 10 determines that the waypoint distance is less than the waypoint threshold value. Otherwise, when the waypoint distance is 50 centimeters, the processor 10 determines that the waypoint distance is not less than the waypoint threshold value.

In an embodiment, when the processor 10 determines that the mobile robot 150 is at the obstacle space starting point SP, the processor 10 controls the mobile robot 150 to move at a first traveling speed (such as a slower traveling speed). When the processor 10 determines that the mobile robot 150 passes by the waypoint WP and moves toward the obstacle space destination EP, the processor 10 controls the mobile robot 150 to move at a second traveling speed (such as a faster traveling speed). The first traveling speed is slower than the second traveling speed.

The processor 10 determines whether the mobile robot 150 already reaches (or passes) the obstacle space starting point SP. When the processor 10 determines that the mobile robot 150 reaches the obstacle space starting point SP, step 340 is performed.

In step 340, the processor 10 obtains a plurality of obstacle distances measured by the distance measuring modules S1 to S5, and gets a first distance and a second distance according to the obstacle distances. For example, a fuzzy theoretical algorithm is applied to the obstacle distances to obtain the first distance and the second distance.

In an embodiment, the first distance represents a right side distance, and the second distance represents a left side distance. The way to obtain the right side distance and the left side distance is described in detail hereinafter.

In an embodiment, the obstacle distance refers to the distance between the mobile robot 150 and the obstacle position.

In an embodiment, as shown in FIG. 1A, the distance measuring modules S1 to S5 are disposed in the front side, the left side, the right side, the left front side, the right front side of the mobile robot 150. The distance measuring module S1 transmits an ultrasonic wave toward an area R1 to determine whether an obstacle is present in the area R1 and to measure the obstacle distance between the obstacle and the mobile robot 150. Similarly, the distance measuring modules S2 S3, S4 and S5 transmit the ultrasonic waves toward the areas R2, R3, R4 and R5 respectively to determine whether the obstacle is present in the areas R2, R3, R4 and R5 and to measure the obstacle distances between the obstacles and the mobile robot 150. In embodiments, the positions of the distance measuring modules S1 to S5 are changed according to requirements, which is not limited herein.

Then, the processor 10 applies the fuzzy theory algorithm to the obstacle distances to obtain the right side distance and the left side distance.

In an embodiment, the fuzzy theory algorithm is a logical method that uses natural language to describe a current state. According to the fuzzy theory algorithm, the characteristics of imprecision and ambiguity of the natural language are used to construct a fuzzy set with fuzzy inferences. A method (which uses the fuzzy theory algorithm) of controlling the uncertainty of a problem handling system has advantages of strong adaptability and robustness.

In an embodiment, the fuzzy theory algorithm includes following formulas:

$$\text{If } x \text{ is } X, \text{ then } y \text{ is } Y; \quad (1)$$

$$R^n: \text{If } x_1 \text{ is } X^n \text{ and } \ldots x_i \text{ is } X_i^n, \text{ then } y \text{ is } Y^n, n=1, 2, \ldots N, i=1, 2, \ldots I; \quad (2)$$

The fuzzy condition indicates a model for fuzzy inference, as shown by the formula (1). In the formula (1), "x is X" is an antecedent, "y is Y" is a consequent, and X and Y are membership functions in the fuzzy set. When the fuzzy inference includes N rules, the formula (2) is formed. In the formula (2), x is an input, y is an output, and I represents the number of the fuzzy sets.

In the formulas (1) to (2), $R^n$ represents nth rules, n ranges from 1 to any natural number N, x represents the obstacle distance, X represents a set of the obstacle distance, y represents a turning coefficient and a traveling speed, Y represents a set of the turning coefficient and the traveling speed, i represents $i^{th}$ set, and i ranges from 1 to any positive natural number I.

Please refer to FIG. 4A to 4F. FIG. 4A to FIG. 4F are schematic diagrams showing an output result from a navigation system 100 in an embodiment. When the number of the sets is five (that is, i=1 to 5), the obstacle distances (which are denoted by SF, SFR, SFL, SR and SL, respectively) measured by the distance measuring modules S1 to S5 correspond to $x_1$~$x_5$, respectively. In other words, when i is five, at least one of the obstacle distances SF, SFR, SFL, SR (not shown) and SL (not shown) that are measured by the distance measuring modules S1 to S5 is introduced to the formula, and the set y of the turning coefficient and the traveling speed is output. The set y of the turning coefficient and the traveling speed belongs to the set Y. The turning coefficient is represented by TCr0, and the traveling speed is represented by Vr0. It is understood by a person skilled in the art that the embodiments in FIG. 4A to FIG. 4F are exemplified only for description. When at least one of the obstacle distances SF, SFR, SFL, SR and SL is obtained, the corresponding turning coefficient and/or traveling speed is calculated to produce at least one of the statistical figures.

In an embodiment, the obstacle distances SF, SFR, SFL, SR and SL measured by the distance measuring modules S1 to S5 represent the distances between the distance measuring modules S1 to S5 and the obstacles (such as the wall BK2), respectively.

Figure 4A:
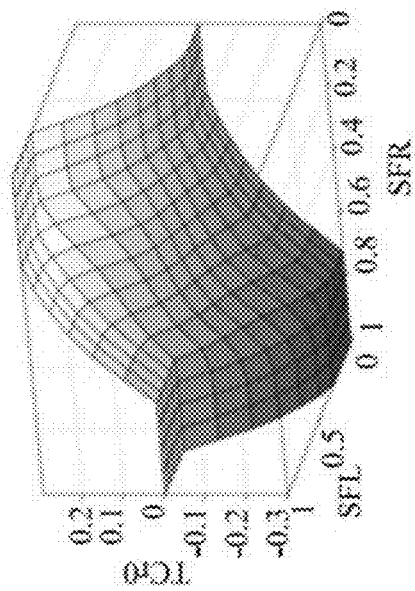
FIGS. 4A to 4F are schematic diagrams showing an output result of a navigation system in an embodiment.
Figure 4B:
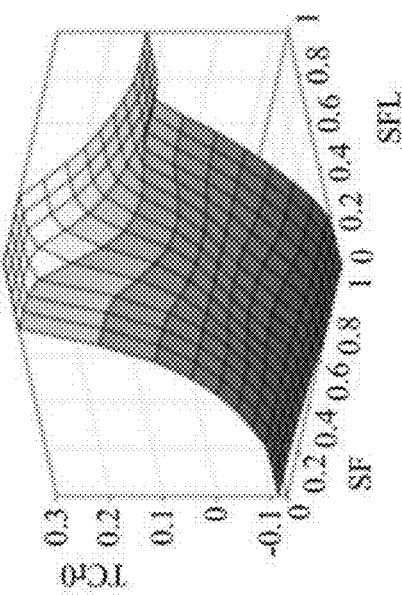
Figure 4C:
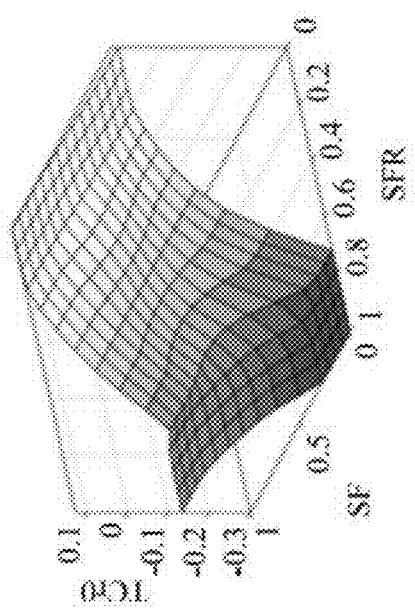

In FIG. 4A, multiple obstacle distances SF measured by the distance measuring module S1 and multiple obstacle distances SFR measured by the distance measuring module S2 are introduced into the fuzzy theory algorithm to obtain multiple turning coefficients TCr0. Similarly, in FIG. 4B, multiple obstacle distances SF measured by the distance measuring module S1 and multiple obstacle distances SFL measured by the distance measuring module S3 are introduced into the fuzzy theory algorithm to obtain multiple turning coefficients TCr0. In FIG. 4C, multiple obstacle distances SFL measured by the distance measuring module S3 and multiple obstacle distances SFR measured by the distance measuring module S2 are introduced into the fuzzy theory algorithm to obtain multiple turning coefficients TCr0.

Figure 4F:
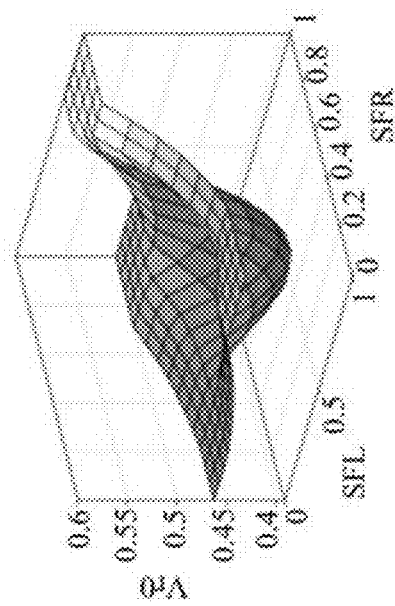
Figure 4E:
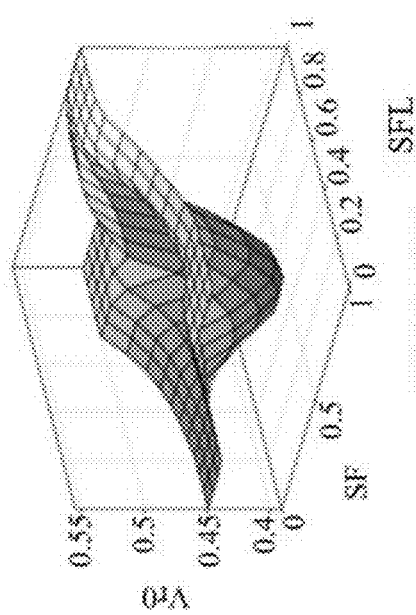
Figure 4D:
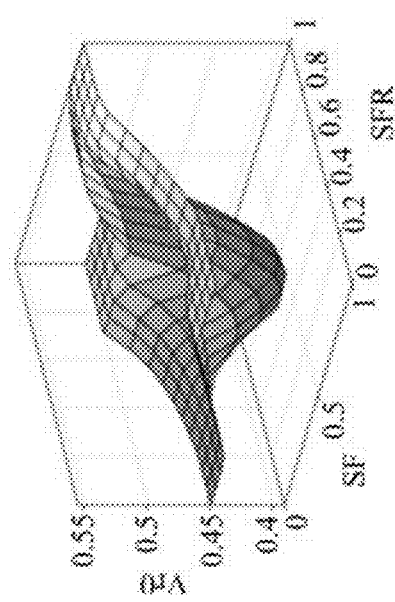

In an embodiment, in FIG. 4D, multiple obstacle distances SF measured by the distance measuring module S1 and multiple obstacle distances SFR measured by the distance measuring module S2 are introduced into the fuzzy theory algorithm to obtain multiple traveling speeds Vr0. Similarly, in FIG. 4E, multiple obstacle distances SF measured by the distance measuring module S1 and multiple obstacle distances SFL measured by the distance measuring module S3 are introduced into the fuzzy theory algorithm to obtain multiple traveling speeds Vr0. In FIG. 4F, multiple obstacle distances SFL measured by the distance measuring module S3 and multiple obstacle distances SFR measured by the distance measuring module S2 are introduced into the frizzy theory algorithm. to obtain multiple traveling speeds Vr0.

Thus, the processor 10 introduces the obstacle distances (such as the obstacle distance SFL and the obstacle distance SFL) into the fuzzy theory algorithm to obtain the turning coefficient TCr0 and the traveling speed Vr0.

In an embodiment, the traveling speed Vr0 and/or the turning coefficient TCr0 that the processor 10 obtains according to the fuzzy theory algorithm represent that the mobile robot 150 moves with the traveling speed Vr0 and/or the turning coefficient TCr0 can avoid colliding with obstacle when the mobile robot 150.

In the embodiment, the processor 10 obtains the current turning coefficient and the current traveling speed of the mobile robot 150 by detecting the speed of the motor or via other known positioning methods, and determines whether the mobile robot 150 is too closed to the left or to the right when reaching the obstacle space (such as the door) according to the current turning coefficient and the current traveling speed. Then, the current turning coefficient and the current traveling speed are adjusted to be the turning coefficient TCr0 and the traveling speed Vr0 to prevent the mobile robot 150 from colliding with the obstacle.

Details for adjusting the current turning coefficient and the current traveling speed to be the turning coefficient TCr0 and the traveling speed Vr0 are described in a following embodiment. In the embodiment, the obstacle distance SFR and the obstacle distance SFL are exemplified for description. The obstacle distance SFR is defined as the right side distance, and the obstacle distance SFL is defined as the left side distance.

Please refer to FIG. 5A to FIG. 5B, FIG. 6A to FIG. 6B, FIG. 7A to FIG. 7B and FIG. 8A to FIG. 8B. FIG. 5A, FIG. 6A, FIG. 7A and FIG. 8A are schematic diagrams showing corresponding relationships between parameters in a navigation method in an embodiment. FIG. 5B, FIG. 6B, FIG. 7B and FIG. 8B are schematic diagrams showing an operation of a navigation system in an embodiment. In the figures, the obstacle distance SFR, the obstacle distance SFL, and the turning coefficient TCr0 are exemplified for illustration. In embodiments, the traveling speed Vr0 or the turning coefficient TCr0 are obtained based on a similar combination or other obstacle distances SF, SR and SL, which is not limited herein. In an embodiment, the obstacle distance SR is defined as the right side distance, and the obstacle distance SF is defined as the left side distance. Thus, the current traveling speed or the turning coefficient are adjusted to be the target traveling speed Vr0 or turning coefficient TCr0 according the obstacle distances.

In the embodiment, the navigation system 100 shown in FIG. 5A to FIG. 5B, FIG. 6A to FIG. 6B, FIG. 7A to FIG. 7B and FIG. 8A to FIG. 8B are similar to the navigation system 100 shown in FIG. 1A. Details for the navigation system 100 are not repeated hereinafter.

In an embodiment, the processor 10 compares the right side distance and the left side distance to determine that the navigation system 100 is close to a right wall BK1 or a left wall BK2 of the door when passing through the narrow obstacle space (such as, the door). Thus, the turning or the speed is adjusted to prevent the mobile robot 150 from colliding with the obstacle (such as the right wall BK1 or the left wall BK2).

Figure 5A:
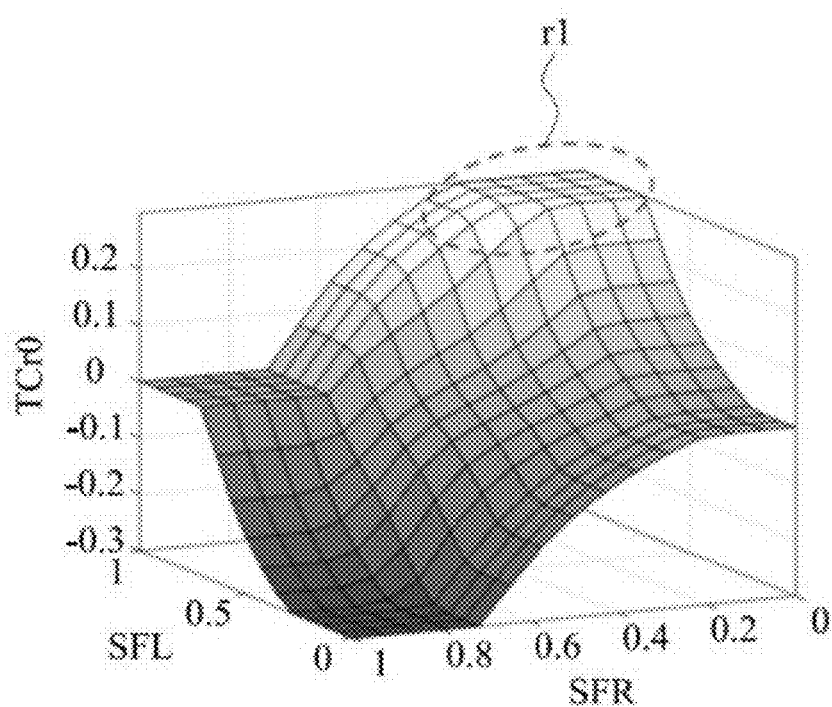
FIGS. 5A, 6A, 7A and 8A are schematic diagrams showing corresponding relationships between parameters in a navigation method in an embodiment.
Figure 5B:
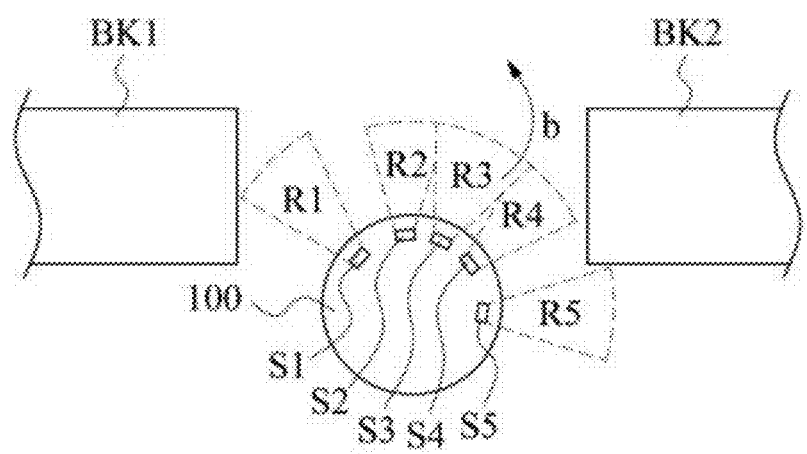
FIGS. 5B, 6B, 7B and 8B are schematic diagrams showing an operation of a navigation system in an embodiment.

In an embodiment, as shown in FIG. 5A to FIG. 5B, in a range r1, when the processor 10 determines the right side distance SFR is less than the left side distance SFL, that means, the mobile robot 150 is closer to the right obstacle relative to the left obstacle. Thus, the processor 10 determines that the mobile robot 150 is closer to the right side. In an embodiment, when the right side distance is less than the left side distance, step 350 is performed. In step 350, the processor 10 controls the mobile robot 150 to have a first movement. The first movement refers to that the mobile robot 150 moves in a left front direction (the direction b as shown in FIG. 5B).

Similarly, in an embodiment, when the right side distance is larger than the left side distance, that means, the mobile robot 150 is closer to the left obstacle relative to the right obstacle. Thus, the processor 10 determines that the mobile robot 150 is closer to the left side. Then, step 360 is performed. In step 360, the processor 10 controls the mobile robot 150 to have a second movement. The second movement refers to that the mobile robot 150 moves in a right front direction.

Figure 6A:
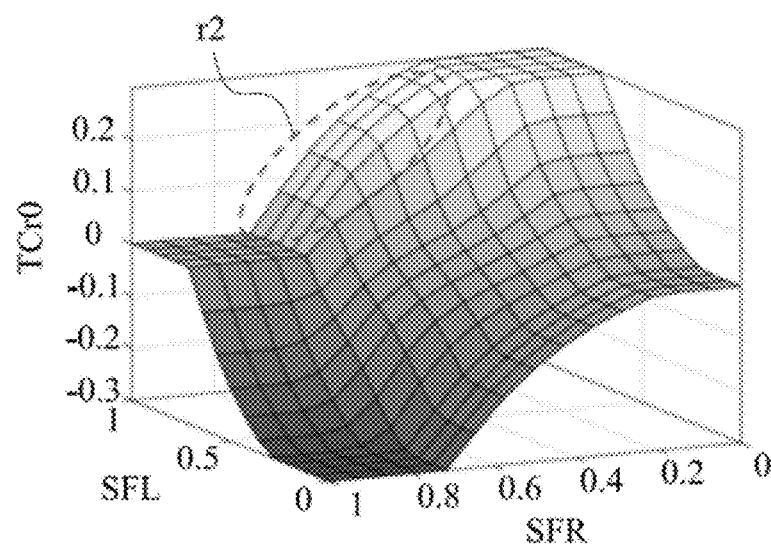
Figure 6B:
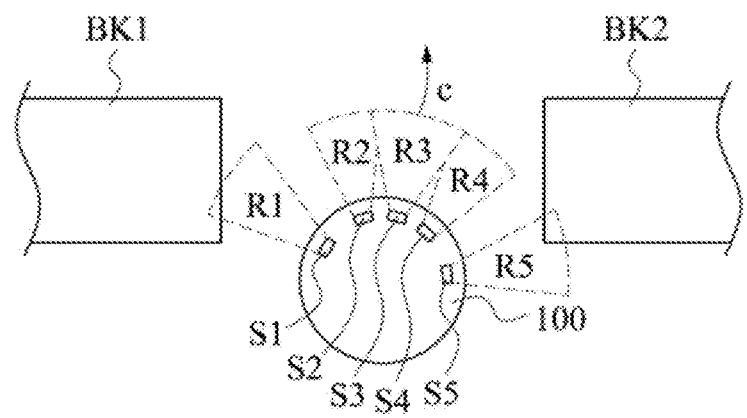

In an embodiment, as shown in FIG. 6A to FIG. 6B, in the range r2, when the processor 10 determines the right side distance SFR is less than the left side distance SFL, the processor 10 subtracts the right side distance from the left side distance to obtain a difference value. The processor 10 determines whether the difference value is larger than a difference threshold value (for example, the difference threshold value is 5 centimeters, and the mobile robot 150 is too close to the right side when the difference value is larger than the difference threshold value). When the processor 10 determines the difference value is larger than the difference threshold value, the first movement of the mobile robot 150 controlled by the processor 10 is that the mobile robot 150 moves in the left front direction (the direction b as shown in FIG. 5B) according to a first turning coefficient (for example, the first turning coefficient is 0.8, which means the mobile robot turns to the left by a larger angle). When the processor 10 determines that the difference value is not larger than the difference threshold value, the first movement of the mobile robot 150 controlled by the processor 10 is that the mobile robot 150 moves in the left front direction (the direction c as shown in FIG. 6B) according to a second turning coefficient (for example, the second turning coefficient is 0.3, which means the mobile robot turns to the left by a smaller angle). An absolute value of the first turning coefficient is larger than the absolute value of the second turning coefficient.

Thus, when the mobile robot 150 is too close to the right obstacle, the processor 10 controls the mobile robot 150 to turn left by a larger angle (that is, the absolute value of the turning coefficient is larger) to avoid the collision. When the mobile robot 150 is slightly closer to the right obstacle, the processor 10 controls the mobile robot 150 to turn left by a smaller angle (that is, the absolute value of the turning coefficient is smaller) to finely adjust the path.

Similarly, in an embodiment, when the right side distance SFR is larger than the left side distance SFL, the processor 10 subtracts the left side distance SFL from the right side distance SFR to obtain the difference value. The processor 10 determines whether the difference value is larger than the difference threshold value (the mobile robot 150 is too close to the left side when the difference value is larger than the difference threshold value). When the processor 10 determines that the difference value is larger than the difference threshold value, the second movement of the mobile robot 150 controlled by the processor 10 is that the mobile robot 150 moves in the right front direction according to the first turning coefficient (for example, the first turning coefficient is −0.8). When the processor 10 determines that the difference value is not larger than the difference threshold value, the second movement of the mobile robot 150 controlled by the processor 10 is that the mobile robot 150 moves in the right front direction according to the second turning coefficient (for example, the second turning coefficient is −0.3). The absolute value of the first turning coefficient is larger than the absolute value of the second turning coefficient.

Thus, when the mobile robot 150 is too close to the left obstacle, the processor 10 controls the mobile robot 150 to turn right by a larger angle to avoid the collision. When the mobile robot 150 is slightly closer to the left obstacle, the processor 10 controls the mobile robot 150 to turn right by a smaller angle to finely adjust the path.

Figure 7A:
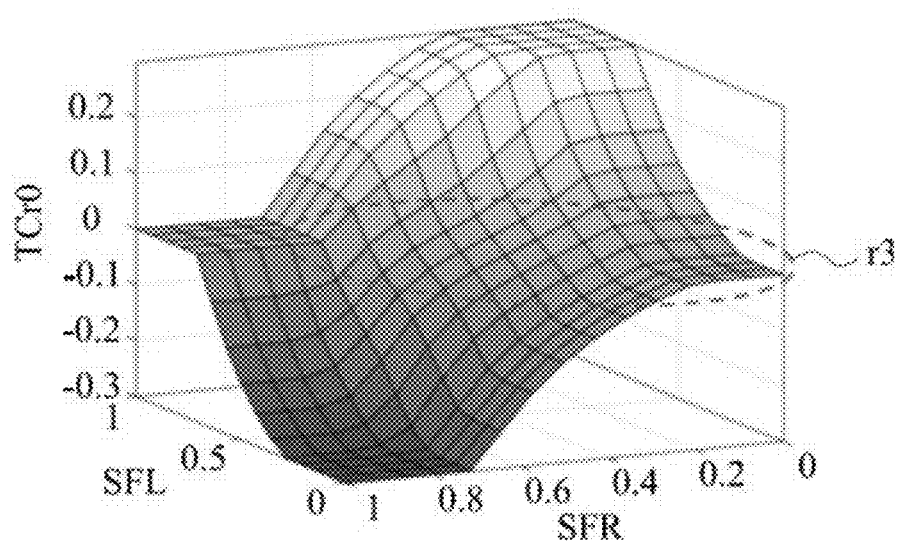
Figure 7B:
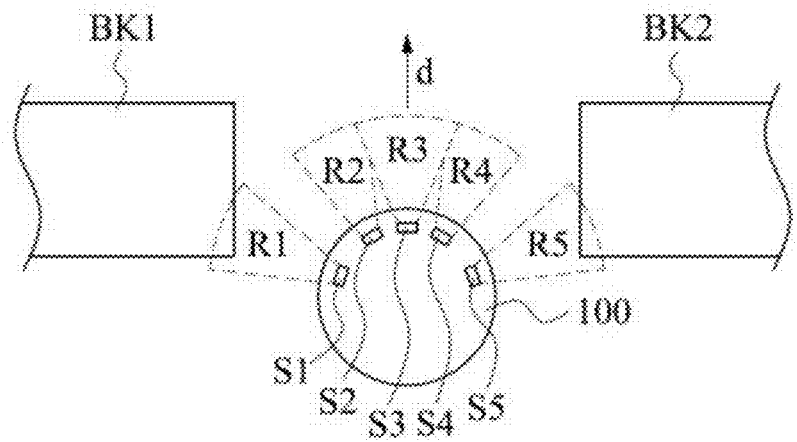

In an embodiment, as shown in FIG. 7A to 7B, in the range r3, when the processor 10 determines the right side distance SFR is equal to the left side distance SFL, that means, the mobile robot 150 moves in a front direction d, step 370 is performed. In step 370, the processor 10 controls the mobile robot 150 to have a third movement. The third movement is that the mobile robot 150 moves forward.

Figure 8A:
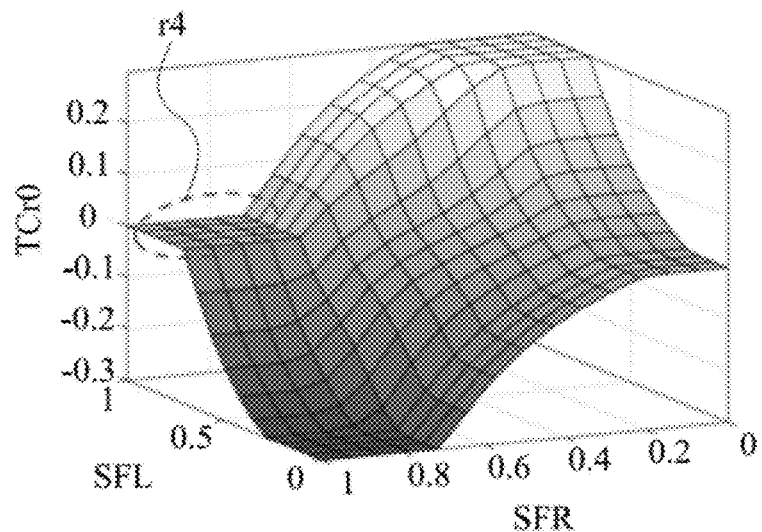
Figure 8B:
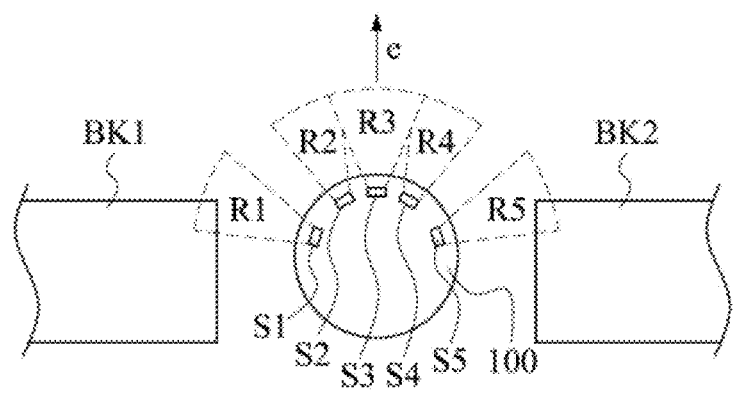

In an embodiment, as shown in FIGS. 8A to 8B, in the range r4, the mobile robot 150 moves straightly in the direction e. In the embodiment, the mobile robot 150 has passed through the waypoint WP safely, without colliding with the obstacle.

By setting the waypoint, the navigation system can determine that the mobile robot is about to move into the narrow space when the navigation system detects that the mobile robot reaches the waypoint. At the time, the navigation system obtains the target traveling speed and turning coefficient of the mobile robot via the fuzzy theory algorithm. The mobile robot moves according to the traveling speed and the turning coefficient, which prevents the mobile robot from colliding with obstacles. Therefore, the movement path of the mobile robot is adjusted according to the traveling speed and the turning coefficient to prevent the mobile robot from colliding with the obstacle.

Although the disclosure has been disclosed with reference to certain embodiments thereof, the disclosure is not for limiting the scope. Persons having ordinary skill in the art may make various modifications and changes without departing from the scope of the disclosure. Therefore, the scope of the appended claims should not be limited to the description of the embodiments described above.

What is claimed is:

1. A navigation system, adapted to an electronic device, comprising:
    a storage module for storing map information;
    a processor configured to control a movement direction of the electronic device according to a navigation path, obtain spatial information, and set a waypoint according to the spatial information, wherein the processor is configured to set the navigation path and obtain the spatial information according to the map information, and the spatial information includes at least an obstacle position; and
    a plurality of distance measuring circuits configured to measure a current position of the electronic device, and to determine a waypoint distance between the current position of the electronic device and the waypoint through the map information;
    wherein when the processor determines the waypoint distance is less than a waypoint threshold value, the processor is configured to calculate a first distance and a second distance according to a plurality of obstacle distances measured by the distance measuring circuits, when the first distance is less than the second distance, the processor is configured to control the electronic device to have a first movement, when the first distance is larger than the second distance, the processor is configured to control the electronic device to have a second movement, when the first distance is equal to the second distance, the processor is configured to control the electronic device to have a third movement,
    wherein the processor is configured to set an obstacle space starting point and an obstacle space destination according to the obstacle position and set the waypoint between the obstacle space starting point and the obstacle space destination;
    wherein when the processor determines the electronic device is at the obstacle space starting point, the processor is configured to control the electronic device to move at a first traveling speed;
    when the processor determines the electronic device passes by the waypoint and moves toward the obstacle space destination, the processor is configured to control the electronic device to move at a second traveling speed; and
    the first traveling speed is slower than the second traveling speed.

2. The navigation system according to claim 1, wherein the distance measuring circuits are disposed in a front side, a left side, a right side, a left front side, a right front side of the electronic device.

3. The navigation system according to claim 1, wherein the obstacle distance is a distance between the electronic device and the obstacle position.

4. The navigation system according to claim 1, wherein the processor is configured to apply a fuzzy theory algorithm to the obstacle distance to obtain a turning coefficient and a traveling speed corresponding a to the first distance and the second distance.

5. The navigation system according to claim 1, wherein the first movement refers to that the electronic device moves toward a left front direction, the second movement refers to that the electronic device moves toward a right front direction, and the third movement refers to that the electronic device moves forward.

6. The navigation system according to claim 1, wherein when the first distance is less than the second distance, the processor is configured to subtract the first distance from the second distance to obtain a first difference value and determine whether the first difference value is larger than a difference threshold value, when it is determined that the first difference value is larger than the difference threshold value, the first movement of the electronic device is that the electronic device moves in a left front direction according to a first turning coefficient, when it is determined that the first difference value is not larger than the difference threshold value, the first movement of the electronic device is that the electronic device moves in a left front direction according to a second turning coefficient;
    wherein an absolute value of the first turning coefficient is larger than the absolute value of the second turning coefficient.

7. The navigation system according to claim 1, wherein when the first distance is larger than the second distance, the processor is configured to subtract the second distance from the first distance to obtain a first difference value and determine whether the first difference value is larger than a difference threshold value, when it is determined that the first difference value is larger than the difference threshold value, the second movement of the electronic device controlled by the processor is that the electronic device moves in a right front direction according to a first turning coefficient, when it is determined that the first difference value is not larger than the difference threshold value, the second movement of the electronic device controlled by the processor is that the electronic device moves in a right front direction according to a second turning coefficient;
    wherein an absolute value of the first turning coefficient is larger than the absolute value of the second turning coefficient.

8. The navigation system according to claim 1, wherein the processor is configured to apply a fuzzy theory algorithm to the obstacle distance to obtain the first distance and the second distance, the fuzzy theory algorithm includes a formula as follows:

if x is X, then y is Y;

$R^n$: if $x_1$ is $X_1^n$ and ... $x_i$ is $X_i^n$, then y is $Y^n$, n=1, 2, ... N, i=1, 2, ... I;

wherein $R^n$ represents nth rule, n ranges from 1 to any natural number N; x represents the obstacle distance, X represents a set of the obstacle distance; y represents a turning coefficient and a traveling speed, Y represents a set of the turning coefficient and the traveling speed; i represents $i^{th}$ set, and i ranges from 1 to any positive natural number I.

9. A navigation method comprising:
    storing a map information via a storage module;
    obtaining spatial information and setting a waypoint according to the spatial information, wherein the processor is configured to set a navigation path and obtain the spatial information according to the map information, and the spatial information includes at least an obstacle position;

measuring a current position of an electronic device, and determining a waypoint distance between the current position of the electronic device and the waypoint through the map information;

determining whether the waypoint distance is less than a waypoint threshold value;

calculating to obtain a first distance and a second distance by a processor according to a plurality of obstacle distances measured by a plurality of distance measuring circuits when it is determined that the waypoint distance is less than a waypoint threshold value, wherein when the first distance is less than the second distance, the processor controls the electronic device to have a first movement, when the first distance is larger than the second distance, the processor controls the electronic device to have a second movement, and when the first distance is equal to the second distance, the processor controls the electronic device to have a third movement; and applying a fuzzy theory algorithm to the obstacle distances by the processor to obtain a turning coefficient and a traveling speed corresponding to the first distance and the second distance.

10. The navigation method according to claim 9, wherein the navigation method further includes:

setting an obstacle space starting point and an obstacle space destination according to the obstacle position, and setting the waypoint between the obstacle space starting point and the obstacle space destination; and determining whether the electronic device is at the obstacle space starting point by the processor;

wherein when the processor determines the electronic device is at the obstacle space starting point, the processor controls the electronic device to move at a first traveling speed;

when the processor determines the electronic device passes by the waypoint and moves toward the obstacle space destination, the processor controls the electronic device to move at a second traveling speed; and the first traveling speed is slower than the second traveling speed.

11. The navigation method according to claim 9, wherein the distance measuring circuits are disposed in a front side, a left side, a right side, a left front side, a right front side of the electronic device.

12. The navigation method according to claim 9, wherein the obstacle distance is a distance from the electronic device to the obstacle position.

13. The navigation method according to claim 9, wherein the first movement refers to that the electronic device moves in a left front direction, the second movement refers to that the electronic device moves in a right front direction, and the third movement refers to that the electronic device moves forward.

14. The navigation method according to claim 9, wherein when the first distance is less than the second distance, the step that the processor controls the electronic device to have the first movement includes:

subtracting the first distance from the second distance to obtain a first difference value and determining whether the first difference value is larger than a difference threshold value by the processor when the first distance is less than the second distance, controlling the electronic device to move toward a left front direction according to a first turning coefficient when the first distance is larger than the difference threshold value; and controlling the electronic device to move toward the left front direction according to a second turning coefficient when it is determined that the first distance is not larger than the difference threshold value;

wherein an absolute value of the first turning coefficient is larger than the absolute value of the second turning coefficient.

15. The navigation method according to claim 9, wherein when the first distance is larger than the second distance, the step that the processor controls the electronic device to have the second movement includes:

subtracting the second distance from the first distance to obtain a first difference value and determining whether the first difference value is larger than a difference threshold value by the processor when the first distance is larger than the second distance:

controlling the electronic device to move in a right front direction according to a first turning coefficient when the first difference value is larger than the difference threshold value; and controlling the electronic device to move in a right front direction according to a second turning coefficient When the first difference value is not larger than the difference threshold value;

wherein an absolute value of the first turning coefficient is larger than the absolute value of the second turning coefficient.

16. The navigation method according to claim 9, wherein the processor is configured to apply the fuzzy theory algorithm to the obstacle distance to obtain the first distance and the second distance, the fuzzy theory algorithm is:

If x is X, then y is Y;

$R^n$: If $x_1$ is $X_1^n$ and ... $x_i$ is $X_i^n$, then y is $Y^n$, n=1, 2, ... N, i=1, 2, ... I;

wherein Rn represents nth rule, n ranges from 1 to any natural number N; x represents the obstacle distance, X represents a set of the obstacle distances; y represents a turning coefficient and a traveling speed, Y represents a set of the turning coefficient and the traveling speed: i represents $i^{th}$ set, and i ranges from 1 to any positive natural number I.

17. A navigation system, adapted to an electronic device, comprising:

a storage module for storing map information;

a processor configured to control a movement direction of the electronic device according to a navigation path, obtain spatial information, and set a waypoint according to the spatial information, wherein the processor is configured to set the navigation path and obtain the spatial information according to the map information, and the spatial information includes at least an obstacle position; and a plurality of distance measuring circuits configured to measure a current position of the electronic device, and to determine a waypoint distance between the current position of the electronic device and the waypoint through the map information;

wherein when the processor determines the waypoint distance is less than a waypoint threshold value, the processor is configured to calculate a first distance and a second distance according to a plurality of obstacle distances measured by the distance measuring circuits, when the first distance is less than the second distance, the processor is configured to control the electronic device to have a first movement, when the first distance is larger than the second distance, the processor is configured to control the electronic device to have a second movement, when the first distance is equal to the second distance, the processor is configured to control the electronic device to have a third movement, wherein the processor is configured to apply a fuzzy theory algorithm to the obstacle distance to obtain the first distance and the second distance, the fuzzy theory algorithm includes a formula as follows:

If x is X, then y is Y;

$R^n$: If $x_1$ is $X_1^n$ and ... $x_i$ is $X_i^n$, then y is $Y^n$, n=1, 2, ... N, i=1, 2, ... I;

wherein $R^n$ represents nth rule, n ranges from 1 to any natural number N; x represents the obstacle distance, X represents a set of the obstacle distance; y represents a turning coefficient and a traveling speed, Y represents a set of the turning coefficient and the traveling speed; i represents $i^{th}$ set, and i ranges from 1 to any positive natural number I.

* * * * *